R. B. PRINDLE.
Plow-Clevis.
No. 24,403.
Patented June 14, 1859.
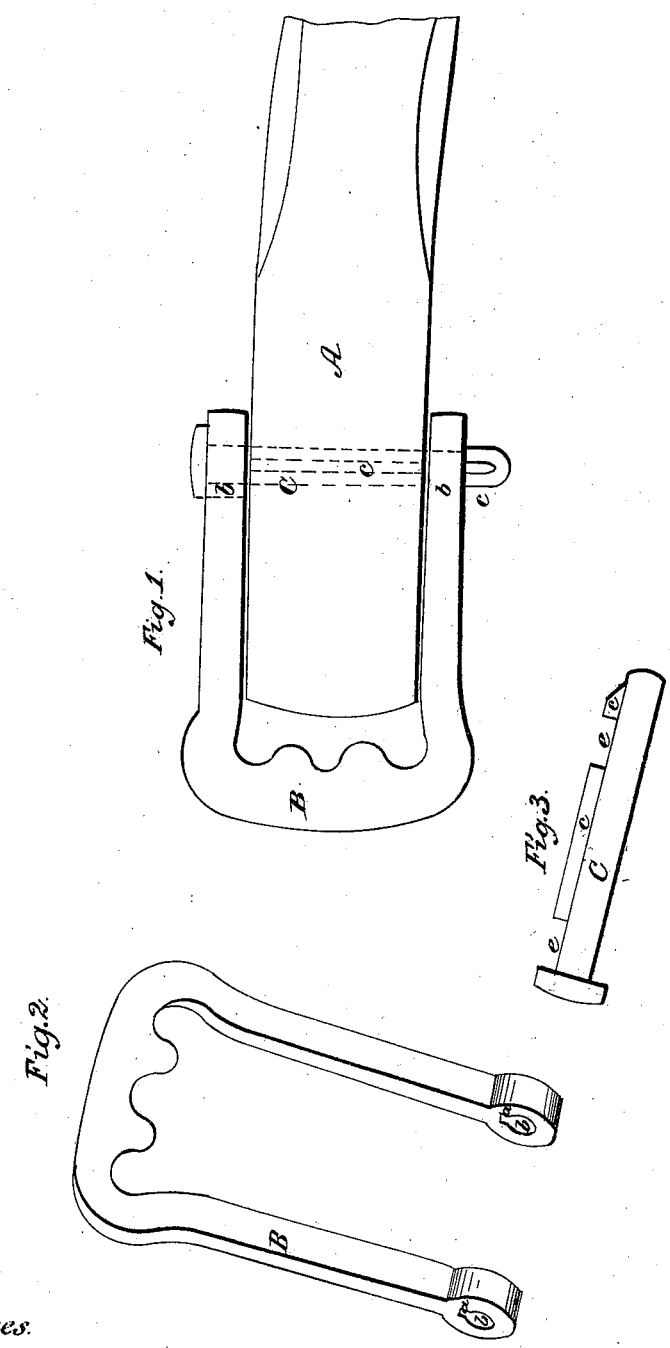

UNITED STATES PATENT OFFICE.

R. B. PRINDLE, OF COVENTRY, NEW YORK.

IMPROVEMENT IN DEVICES FOR SECURING THE CLEVIS TO PLOWS.

Specification forming part of Letters Patent No. 24,403, dated June 14, 1859.

*To all whom it may concern:*

Be it known that I, R. B. PRINDLE, of the town of Coventry, in the county of Chenango, State of New York, have invented new and useful Improvements in a Clevis and Pin for Plows or Whiffletrees; and I do hereby declare that the following is a clear and exact description of the same, reference being had to the accompanying drawings, which make a part of this specification.

The nature of my invention consists in a method of fastening clevises to plow-beams, as hereinafter described.

Figure 1 represents the beam of a plow with the clevis attached. Figs. 2 and 3 show the clevis and pin detached.

To enable others skilled in the art to make and use my improvement, I will describe it, referring to the drawings, in which like letters refer to like parts.

A is a section of the beam of a plow, with the clevis B attached. C is an iron bolt which secures the clevis. *b b* are the rings or eyes in the clevis through which the bolt passes, and in which grooves *a a* are cut corresponding with a groove in one side of the bolt-hole in the beam A on one side of the bolt, and longitudinally therewith a feather, *c*, is swaged the whole length of the bolt, except the spaces *e e*, Fig. 3, which are left for the purpose of admitting the clevis to turn freely on the bolt within the spaces, and securely holding it in position. The feather *c*, fitting into the groove in the hole in the beam, prevents the bolt from turning therein, and the front of the feather, projecting beyond the clevis, secures the bolt in place.

In putting my improvement into operation the process is simply to pass the eyes of the clevis until they come in contact with the bolt-hole in the beam, bringing the grooves in the eyes of the clevis and the groove in the bolt-hole of the beam in proper position for the insertion of the bolt, which being done, and the clevis turned into the proper position, the whole is perfectly secured in place and ready for operation.

The advantages of this mode of fastening will be readily perceived from its simplicity, effectual security, and the ease with which the clevis may be put in place and taken off without the aid of a hammer, wrench, or other tool.

Having thus fully described my invention, what I claim as new, and desire to secure by Letters Patent, is—

The arrangement of the pin C, feather or rib *c*, spaces *e e*, clevis B, beam A, and groove *a*, as described, for the purposes set forth.

R. B. PRINDLE.

Attest:
C. P. BLAKELEY,
I. S. SAMSON.